Oct. 12, 1965  L. C. CHOUINGS  3,211,261
SPOT-TYPE DISC BRAKES
Filed Dec. 4, 1962  4 Sheets-Sheet 1
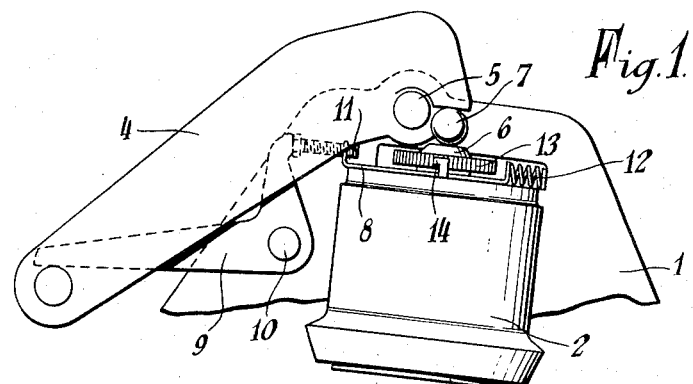
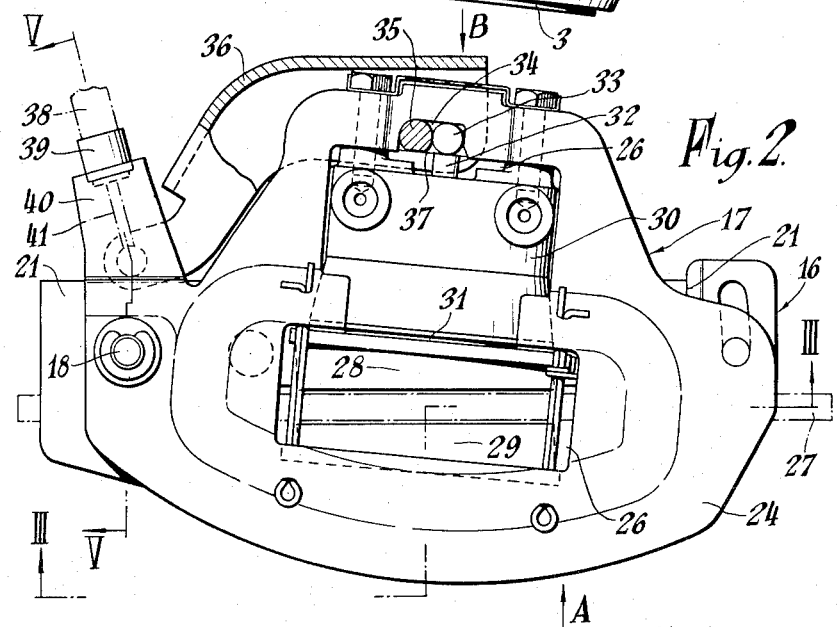
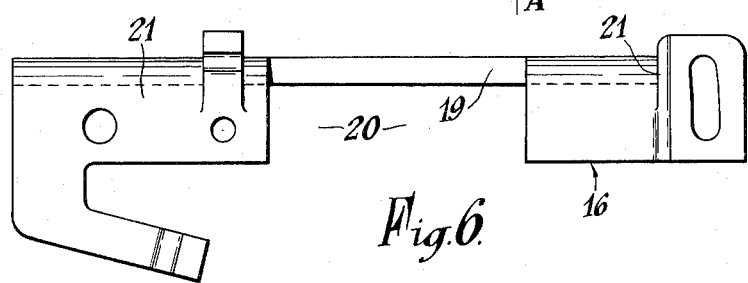
INVENTOR
Leslie C. Chouings
BY
Lawrence J. Winter
ATTORNEY

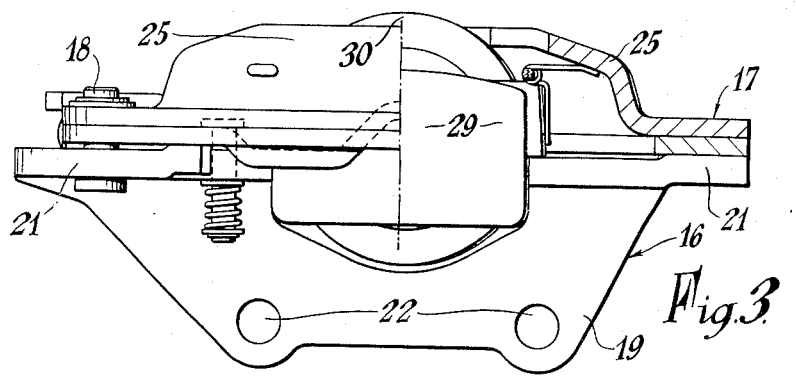
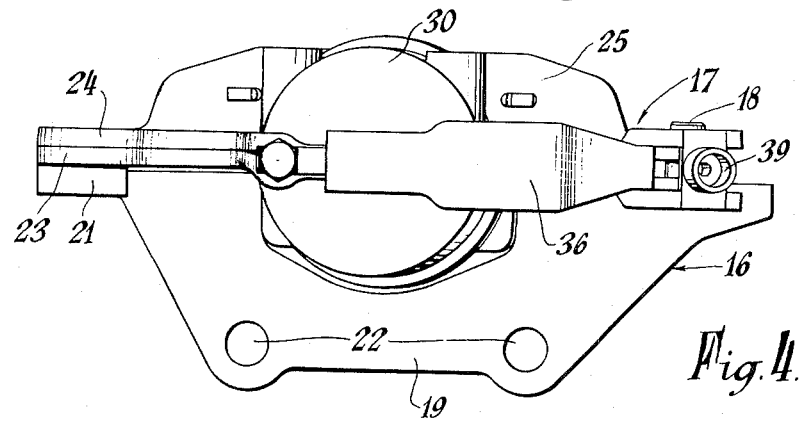
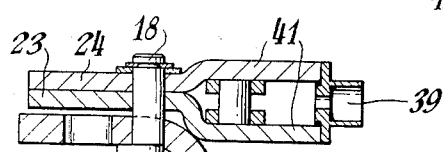
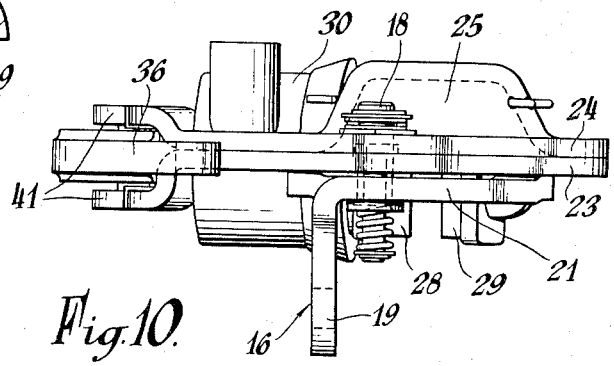

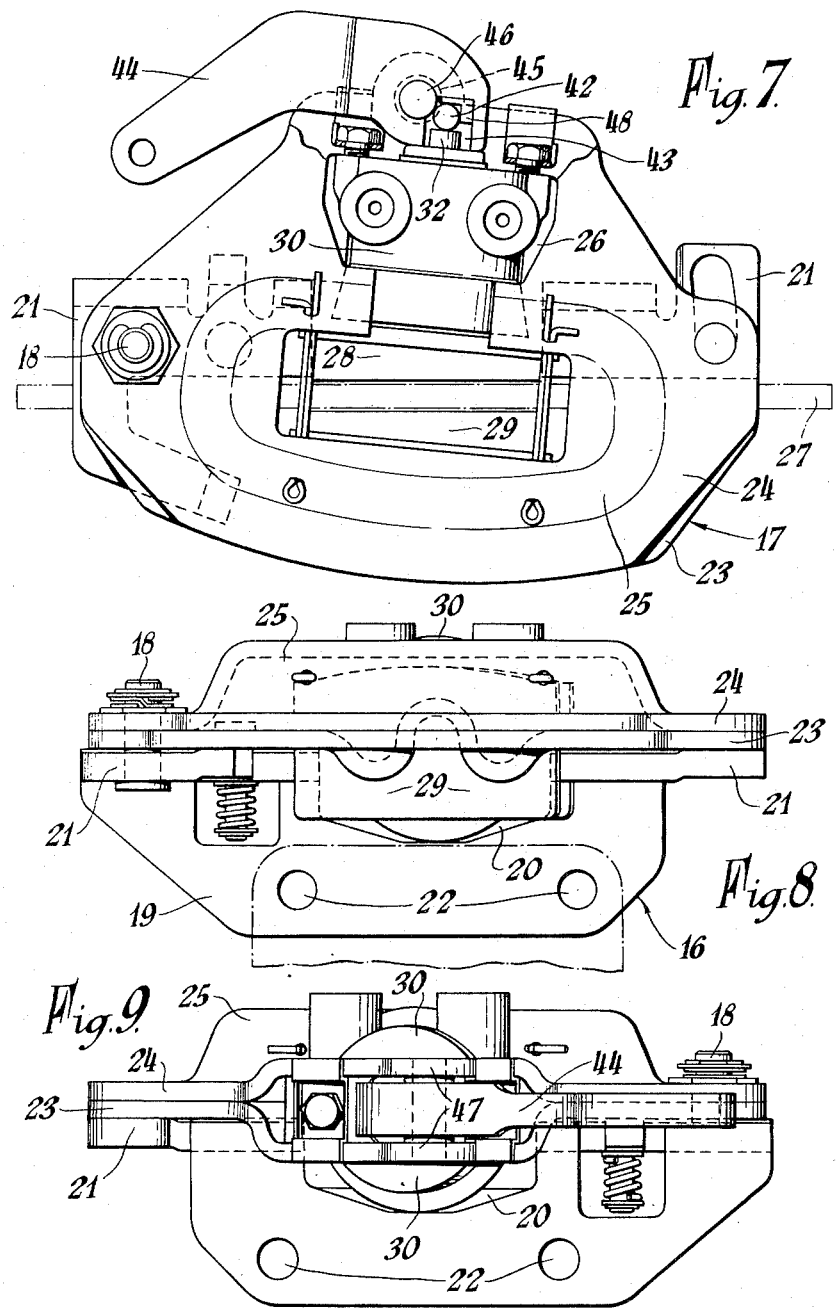

United States Patent Office 3,211,261
Patented Oct. 12, 1965

1

3,211,261
SPOT-TYPE DISC BRAKES
Leslie C. Chouings, Leamington Spa, England, assignor to Automotive Products Company Limited, Leamington Spa, England
Filed Dec. 4, 1962, Ser. No. 242,156
Claims priority, application Great Britain, Dec. 5, 1961, 43,514/61; Apr. 6, 1962, 13,363/62
5 Claims. (Cl. 188—73)

This invention relates to disc brakes of the kind in which the brake pads disposed on one side of the brake disc are applied to the brake disc to effect braking by effecting pivotal or rectilinear sliding movement of a movable member or members by operation of brake actuating means associated with the brake pad or pads on the opposite side of the brake disc.

The invention has for its object to provide an improved construction of brake actuating means for the mechanical operation of a disc brake of the kind set out above.

According to the invention the brake actuating means comprises an actuating lever for pivotal mounting on the movable member of the brake mechanism and adapted for connection to operator controlled brake operating means and a roller or ball disposed in the region of the pivotal axis of the actuating lever for transmitting thrust to a brake pad or pads on one side of the brake disc upon pivotal movement of the lever as a result of operation of the operator control. It will be appreciated that to obtain the required operating thrust with an actuating lever of practical length, it is desirable that the ball or roller be positioned as close as possible to the pivotal axis of the lever, the use of a ball or roller ensuring that the distances will remain substantially constant during pivotal movement of the actuating lever. The ball or roller can for example be interposed between one end of the actuating lever and an end of a thrust rod or other axially displaceable member associated with a brake pad or pads on one side of the brake disc and mounted so as to be movable from a retracted position towards the brake pads upon actuation of the actuating lever to apply the brake.

The brake actuating means of the present invention can be used for operating a wholly mechanically operated disc brake but is particularly suitable for incorporation in a fluid pressure operated disc brake to permit such a brake to be operated mechanically so that the same can be used as a hand brake.

Embodiments of the invention will now be described by way of example by aid of the accompanying drawings in which:

FIGURE 1 is a fragmentary view of a fluid pressure operated disc brake incorporating the mechanical brake actuating means according to one embodiment of the invention, the brake also having means operable automatically to effect adjustment of the brake to compensate for wear of the brake pads.

FIGURE 2 is a view of a fluid pressure operated disc brake having a pivotally mounted movable member and incorporating the mechanical brake actuating means according to a further embodiment of the invention.

FIGURE 3 is a view partly in section in the direction of arrow A in FIGURE 2;

FIGURE 4 is a view in the direction of arrow B in FIGURE 2;

FIGURE 5 is a section on the line V—V in FIGURE 2;

FIGURE 6 is a view of the fixed support of the disc brake in FIGURE 2;

2

Figure 11:
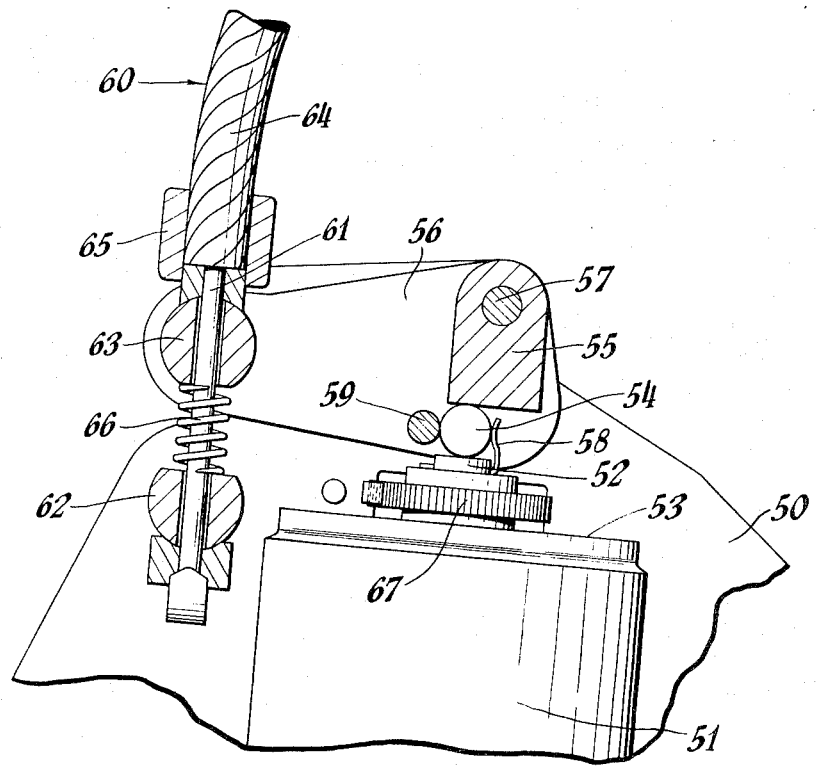

FIGURE 7 is a view of a fluid pressure operated disc brake having a pivotally mounted movable member and incorporating the mechanical brake actuating means according to a still further embodiment of the invention.

FIGURE 8 is a view in the direction of arrow C of FIGURE 7;

FIGURE 9 is a view in the direction of arrow D of FIGURE 7; and

FIGURE 10 is a view as seen from the left of FIGURE 7 rotated 90° about an axis parallel to the plane of the disc;

FIGURE 11 is a fragmentary view of a fluid pressure operated disc brake incorporating the mechanical brake actuating means according to a further embodiment of the invention.

Referring to FIGURE 1 of the drawings a fragmentary part only of a hydraulically operated disc brake is shown. The disc brake comprises broadly a movable member 1 only part of which is shown, which is adapted to be mounted on a fixed support (not shown) on or secured to a fixed part of a wheel assembly, the movable member being either mounted so as to be capable of rectilinear sliding movement or pivotally mounted so as to be swingable. The movable member carries a wheel cylinder 2 for connection to the hydraulic circuit of the braking system, the movable member being located on the wheel assembly by the fixed support so that the outer end of the piston 3 faces a brake pad on one side of the brake disc. In operation, upon the admission of hydraulic liquid to the wheel cylinder 2, the brake pad is moved into contact with the brake disc, the reaction set up resulting in movement of the movable member 1 to bring the brake pad on the other side of the brake disc also into contact therewith. The movable member can for example be of closed loop construction as disclosed in the specification of co-pending British application No. 31,385/60 and can be capable of rectilinear movement as disclosed in the specification of such prior application or pivotally mounted so as to capable of swinging movement as disclosed in the specification of co-pending British application No. 35,727/60.

To adapt the brake above described for mechanical operation, independent of the hydraulic operation, so that the same can be operated manually from the hand brake, a lever 4 is pivotally mounted adjacent one of its ends on a pivot pin 5 carried by the movable member, the lever engaging one end of a thrust member 6 associated with the piston 3, through a ball 7, the free end of the lever being adapted for coupling to the hand brake lever through for example a "Bowden" or other flexible cable. The pivot pin 5 extends at right angles to the plane of movement of the movable member so that the lever 4 lies substantially parallel to said plane, the pivot pin being located so that the end of the lever adjacent the pivot pin is in the region of an outer end of the thrust member 6, the inner end of which extends axially through an aperture in the closed end of the hydraulic cylinder so as to be engageable with the piston 3. Sealing means are provided to form a sealed joint between the thrust member and aperture to prevent leakage of hydraulic liquid from the cylinder. The edge of the lever 4 facing the outer end of the thrust member 6 is flat and bears on the ball 7, the ball being located in close proximity to the pivot pin 5. With this arrangement the distance separating the point of application of force to the thrust member is small and such distance will remain substantially constant as the lever is turned about the pivot pin.

In the arrangement shown in FIGURE 1, the lever 4 is connected to the hand brake linkage so that when the hand brake is applied, the lever 4 turns in a clockwise direction about the pivot pin 5. Thus the thrust member 6 is moved axially inwardly of the cylinder 2 to push the piston 3 outwards to press the associated brake pad into contact with the brake disc.

Means are provided for effecting automatically adjustment of the brake to compensate for wear in the brake pads. For this purpose the thrust member is constructed so that the effective length of the same can be varied as a result of rotation of an associated ratchet wheel under the action of a pawl carrying slide.

The slide 8 is mounted adjacent the closed end of cylinder 2 so as to be capable of sliding movement at right angles to the cylinder axis. The slide is moved through the medium of a bell crank lever 9 pivotally mounted about its elbow on a pivot pin 10 carried by the movable member 1. One arm of the bell crank lever is engageable by an abutment of the lever 4, the other arm of the bell crank lever engaging the head of an adjusting screw 11 carried by the slide 8. The slide is spring loaded by a coil spring 12 which urges the slide to the left, to maintain contact between the adjusting screw and bell crank lever and to return the slide to its initial position. The thrust member 6 consists of an internally threaded tube in threaded engagement with a spindle fixedly mounted in the centre of the hollow piston, the tube carrying an extension piece or head which in turn carries a ratchet wheel 13, the teeth of which are engaged by a pawl 14 carried by the slide 8. Compensation for pad wear takes place during return movement of the slide. Operation of the hand brake lever to apply the brake moves the slide to the right against the action of its associated spring 12, the pawl 14 carried by the slide overriding the teeth of the ratchet wheel. If excessive wear has taken place the pawl will drop into driving engagement with one of the ratchet teeth and consequently on the hand brake lever being returned to its initial position, the slide 1 will also be moved by its associated spring to its initial position, the pawl rotating the ratchet wheel and tube to increase the effective length of the thrust member and move the brake pads closer to the disc. A second pawl not shown, is preferably provided for holding the ratchet wheel in its adjusted position. If no adjustment is required the amount of movement of the slide will be insufficient to cause the pawl to override the engaged tooth and accordingly the same will only ride up the tooth flank.

By mounting the bell crank lever on the movable member and by suitably dimensioning the bell crank lever, the slide can be moved through a distance commensurate with that required to provide the necessary adjustment in the event of there being excessive pad wear.

The lever may be of the pull type in which case the flexible cable connected to the hand brake lever will itself be connected with the extremity of the lever or of the push type in which the cable will be anchored to the loop or other type movable member, the cable sleeve engaging the lever.

It is preferred that the lever shall be fitted with an offset block which engages the periphery of the roller or ball.

FIGURES 2 to 6 and FIGURES 7 to 10 of the accompanying drawings show two alternative forms of construction of the mechanically operated brake actuating means of the invention, the said means in each case being incorporated in a disc brake of the kind disclosed in the specification of co-pending British application No. 35,727/60. The disc brake shown in FIGURES 2 to 6 and the disc brake shown in FIGURES 7 to 10 are of substantially identical construction and following is a general description thereof, the same reference numerals being used to identify the corresponding parts.

According to this particular embodiment, the disc brake comprises a fixed support 16 and a movable member 17 carried by the fixed support so as to be swingable about a pivot pin 18 carried by the fixed support. The fixed support, see FIGURE 6, has a web portion 19 having a gap 20 in its central region and flange portions 21 extending laterally at each side of the gap. The fixed support is mounted on the stationary part of a vehicle wheel assembly by bolts passing through bolt holes 22 in the web with the movable member arranged in a plane normal to the plane of rotation of the brake disc, in which plane it is supported by the flange portions 21. The movable member is of laminar construction and consists of two plates 23, 24 arranged one on the other and secured together by rivets, welding or other means so as to form a rigid structure. The plate, 23 is a substantially flat plate the other plate 24 being dished in its central region to provide a dished portion 25. The plates 23, 24 have an opening 26 to receive a peripheral portion of the brake disc 27 and brake pads 28, 29 arranged opposite one another, one on either side of the brake disc. The movable member carries a hydraulic wheel cylinder 30 arranged on one side of the brake disc, the cylinder having a piston 31 the outer end of which faces the brake pad 28 on the corresponding side of the brake disc. In operation, outward movement of the piston resulting from the admission of hydraulic liquid under pressure to the cylinder, results in movement of the corresponding brake pad into contact with the brake disc, the reaction force thus set up causing swinging movement of the movable member in a direction opposite to the movement of said piston operated brake pad. This movement causes an edge of the opening in the movable member to engage the other brake pad, and also bring the same into contact with the brake disc whereby a braking action is obtained under hydraulic actuation of the brake. The piston is operable mechanically by the brake actuating means of the present invention upon operation of the hand brake lever, such mechanical operation of the piston being effected through a thrust member 32 disposed co-axially with the piston and axially slidable through a sealing gland in the closed end of the wheel cylinder. The inner end of the thrust member 32 extends into the wheel cylinder whilst the outer end projects out of the guide so as to be engageable by a roller 33 of the mechanical brake actuating means.

In the present embodiment of the mechanical brake actuating means, the roller 33 is disposed in a slot 34 in the movable member 17, the slot being formed in the edge of the opening 26, which edge extends parallel to the closed end of the wheel cylinder. The roller 33 is disposed towards one end of the slot, alongside a pivot pin 35 carried by the movable member and for mounting the brake actuating lever 36, the length of the slot being such as to maintain the roller periphery in contact with the periphery of the pivot pin 35. The actuating lever 36 is of channel section and is mounted so as to embrace the adjacent outer edge of the movable member, the opposite sides of the end of the lever in the region of the roller and pivot pin each having a slot 37, arranged opposite to one another to receive opposite ends of the roller, the pivot pin 35 extending through the slots 37. The end of the lever 36 opposite to the pivoted end is connectable to the hand brake by a flexible cable 38, one end of the casing of which is connected to a nipple 39 carried by extension portions 40 of the plates 23, 24 of the movable member, the cable core 41 being in turn connected to this end of the actuating lever, which end extends between the extensions 40. When the hand brake is operated, a pull is applied to the flexible cable which results in swinging movement of the lever 36 in the clockwise direction (FIGURE 2) with the result that the thrust member is pushed inwardly of the wheel cylinder, the piston moving outwardly to apply the brake pad 28 to the brake disc, the reaction set up causing swinging movement of the movable member to apply the other brake pad to the brake disc. Power operation of the brake is effected in the usual manner by the admission of hydraulic liquid to the wheel cylinder, such power operation being completely independent from the manual operation effected by the hand brake.

In the particular construction of the brake actuating means of the present invention according to FIGURES 7 to 10 of the drawings, a roller 42 is disposed within a cavity provided by a hole 43 extending into the actuating lever 44 from one edge thereof, the axis of the hole being at right angles to a further hole 45 extending through the thickness of the lever to receive a pivot pin 46 carried by the movable member 17, the pivotal end of the lever 44 being disposed between spaced or joggled portions 47 of the plates 23, 24 of the movable member. The axes of the two holes 43, 45 are offset to one another lengthwise of the actuating lever 44 such that the two holes break into one another to expose a portion of the periphery of the pivot pin 46 so that the roller when disposed within the cavity is in peripheral contact with the exposed peripheral portion of the pivot pin. In order to facilitate production and ensure the maintenance of contact between the roller 42 and the pivot pin 46, the diameter of the hole 43 forming the cavity is sufficient to permit the insertion of a liner or shoe 48 of hardened steel between the roller and the inner surface of the cavity, such liner or shoe also providing hardened bearing surfaces which reduce wear on the actuating lever. The free end of the actuating lever 44 is connectable by for example a flexible cable to the hand brake.

In the particular arrangements disclosed in connection with the embodiments described above the actuating lever is operated by applying a pull thereto through the flexible cable. As previously referred to however, the lever can be of the push type and an embodiment according to this aspect of the invention is disclosed in FIGURE 11 of the accompanying drawings.

As in FIGURE 1 of the drawings, FIGURE 11 now to be described, shows only a fragmentary part of a hydraulically operated disc brake. The disc brake comprises broadly a movable member 50 only part of which is shown, which is adapted to be mounted on a fixed support (not shown) on, or secured to a fixed part of a wheel assembly, the movable member being mounted so as to be capable of rectilinear sliding movement or pivotally mounted so as to be swingable. The movable member carries a wheel cylinder 51 for connection to the hydraulic circuit of the braking system, the movable member being located on the wheel assembly by the fixed support so that the outer end of the piston of the wheel cylinder faces a brake pad on one side of the brake disc. The brake operation is as described in connection with the embodiment of FIGURE 1, and the movable member can be of closed loop construction as disclosed in the specification of co-pending British application No. 31,385/60 and capable of rectilinear sliding movement as also disclosed therein, or capable of swinging movement as disclosed in the specification of co-pending British application No. 35,727/60.

To adapt the brake of this embodiment of the invention for mechanical operation, a thrust member 52 is provided which extends through the closed end 53 of the wheel cylinder 51, the inner end of the thrust member being engageable with the piston and the outer end being in contact with the periphery of a thrust transmitting roller 54 which is disposed between the end of the thrust rod and an abutment provided by the end face of a block 55 forming part of a brake actuating lever 56. The brake actuating lever is pivotally mounted at its end adjacent the roller, on a pivot pin 57 carried by the movable member 50 so as to be swingable in a plane parallel to the plane of movement of the movable member. The roller 54 is retained in position by a retaining leaf spring 58 and a pin 59. The brake actuating lever 56 is connectable to the vehicle hand brake by a flexible cable denoted generally by reference numeral 60, the cable core 61 being anchored at one end to a pin 62 carried by the movable member 50. The core 61 passes through a hole in the pin 62, and also through a hole in a further anchor pin 63 carried by the lever 56, the pin 63 forming an abutment for the adjacent end of the cable casing 64 which is provided with a nipple 65. A coiled compression spring 66 acting between the two anchor pins 62, 63 urges the brake actuating lever 56 to a position of rest. When the hand brake is operated to apply the brakes, the cable casing 64 exerts a push on the brake actuating lever 56 so that the same turns in the anti-clockwise direction against the action of the spring 66, the turning movement resulting in inward movement of the thrust member 52 in the wheel cylinder, the thrust being transmitted through the roller 54. To provide for adjustment of the brake to compensate for wear in the brake pads, the thrust member can consist of telescopic members having inter-engaging screw threads relative rotation of the members resulting in variation of the effective length of the thrust member. Such rotation can be effected through ratchet and pawl mechanism as previously described, the ratchet wheel 67 being carried by one of the telescopic members and the pawl (not shown) by the brake actuating lever 56.

With the construction of brake actuating means disclosed in connection with FIGS. 2 to 6 or FIGS. 7 to 10 of the accompanying drawings, the ball or roller will be disposed an absolute minimum from the pivotal axis of the actuating lever. Advantageously the disc brakes according to these two embodiments and the embodiment of FIGURE 11, can also incorporate means for automatically adjusting the brake to compensate for wear of the brake pads. Any suitable means for this purpose can be used, for example as disclosed in the specification of co-pending British application No. 13,361/62.

The actuating means of the present invention can also be incorporated in a disc brake of the kind disclosed in the specification of co-pending British application No. 31,385/60.

I claim:
1. A disc brake assembly for a rotating brake disc comprising a lower fixed support with a substantially horizontal portion, an upper continuous closed loop horizontal portion with a central opening having its lower surface slidably disposed on the upper surface of said lower fixed horizontal portion, the opposite ends of said upper and lower portions being disposed substantially adjacent each other, a vertical pivot pin means connecting an adjacent end of said upper and lower portions together and the other adjacent ends of said upper and lower portions being freely movable with respect to each other to permit substantial swinging movement of said upper portion's other adjacent end with respect to said lower portion's other adjacent end, a rotating brake disc extending into said opening, brake pad means disposed in said opening on opposite sides of and adjacent said brake disc for applying a braking force thereto, brake actuating means fixed to said closed loop for movement therewith, said actuating means being disposed adjacent one of said brake pads and opposite said rotating brake disc for forcing said pads against said brake disc, a thrust pin extending outwardly from said actuating means and in a direction away from the side of one said brake pad, roller means disposed in alignment with the longitudinal axis of said thrust pin and having its periphery in contact with said thrust pin, a lever arm pivot pin connected to said closed loop member and in continuous contact with said roller means, a lever arm pivotally connected to said lever arm pivot pin with an inner end in contact with said roller means for operating said actuating means.

2. The disc brake of claim 1 wherein a flexible cable is operatively connected to said lever arm.

3. The disc brake of claim 2 wherein said cable is positioned to apply a pull to said lever arm to operate said brake actuating means.

4. The disc brake of claim 2 wherein said cable is disposed to apply a push to said lever arm to operate said brake actuating means.

5. The disc brake of claim 1 wherein said lever arm has a slot and said pivot pin and roller means are disposed in said slot.

References Cited by the Examiner

UNITED STATES PATENTS

| | | | |
|---|---|---|---|
| 2,804,177 | 8/57 | Helvern | 188—196 X |
| 2,966,964 | 1/61 | Brueder | 188—152 |

FOREIGN PATENTS

| | | |
|---|---|---|
| 703,860 | 2/54 | Great Britain. |
| 728,376 | 4/55 | Great Britain. |
| 734,271 | 7/55 | Great Britain. |
| 829,866 | 3/60 | Great Britain. |
| 1,226,533 | 2/60 | France. |
| 1,238,036 | 6/60 | France. |

MILTON BUCHLER, *Primary Examiner.*

EUGENE G. BOTZ, *Examiner.*